United States Patent
Mazukabzov et al.

(10) Patent No.: US 10,320,950 B2
(45) Date of Patent: Jun. 11, 2019

(54) OPTIMIZED SYNCING OF METADATA CHANGES USING CHUNKED RESPONSE

(71) Applicant: Microsoft Technology Licensing, LLC, Redmond, WA (US)

(72) Inventors: Alexander Yuryevich Mazukabzov, Redmond, WA (US); Rayyan Jaber, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 180 days.

(21) Appl. No.: 15/393,991

(22) Filed: Dec. 29, 2016

(65) Prior Publication Data
US 2018/0191869 A1 Jul. 5, 2018

(51) Int. Cl.
G06F 15/16 (2006.01)
H04L 29/06 (2006.01)
H04L 29/08 (2006.01)

(52) U.S. Cl.
CPC .......... H04L 67/42 (2013.01); H04L 67/1095 (2013.01)

(58) Field of Classification Search
USPC ................................. 709/203, 202, 201, 231
See application file for complete search history.

(56) References Cited

U.S. PATENT DOCUMENTS

| | | |
|---|---|---|
| 7,715,444 B2 | 5/2010 | Goyal et al. |
| 7,778,960 B1 | 8/2010 | Chatterjee et al. |
| 2005/0021626 A1* | 1/2005 | Prajapat ............ G06F 17/30873 709/205 |
| 2008/0189440 A1 | 8/2008 | Goyal et al. |
| 2010/0100590 A1 | 4/2010 | Palay et al. |
| 2014/0074783 A1* | 3/2014 | Alsina .................... G06Q 10/10 707/624 |
| 2014/0101098 A1* | 4/2014 | Robert ................ G06F 17/3002 707/609 |
| 2014/0229330 A1* | 8/2014 | Flores ............... G06F 17/30345 705/26.41 |

(Continued)

FOREIGN PATENT DOCUMENTS

EP 0550197 A2 7/1993

OTHER PUBLICATIONS

Archibald, Jake, "Introducing Background Sync", https://developers.google.com/web/updates/2015/12/background-sync, Published on: Nov. 8, 2016., 13 pages.

(Continued)

*Primary Examiner* — Lan Dai T Truong

(57) ABSTRACT

Aspects of the present disclosure relate to systems and methods for optimizing syncing of metadata changes using a chunked response. In one aspect, an application may be launched in a foreground of a client computing device. A single streaming request may be sent to an application service for updated metadata of a dataset while the application is running in the foreground. A response to the single streaming request may be received at the client computing device. The response may include the updated metadata of the dataset, where the updated metadata is represented as a plurality of pages. While the application is running in a background of the client computing device, each page of the plurality of pages may be processed as the response to the single streaming request is received.

20 Claims, 7 Drawing Sheets

(56) References Cited

U.S. PATENT DOCUMENTS

2016/0162594 A1* 6/2016 Seacat DeLuca ............................ G06F 17/30882 715/208
2018/0081976 A1* 3/2018 Dejuan ............. G06F 17/30867

OTHER PUBLICATIONS

"Reset Sync Manager", https://help.quickbooks.intuit.com/en/kb/reset-data-sync/HOW12686, Retrieved on: Nov. 4, 2016, 4 pages.

Knauth, et al., "dsync: Efficient Block-wise Synchronization of Multi-Gigabyte Binary Data", In Proceedings of the 27th Large Installation System Administration Conference, Nov. 3, 2013, pp. 45-58.

"Sending and Syncing Data", https://developer.android.com/training/wearables/data-layer/index.html, Retrieved on: Nov. 4, 2016, 4 pages.

Koorapati, Nipunn, "Streaming File Synchronization", https://blogs.dropbox.com/tech/2014/07/streaming-file-synchronization/, Published on: Jul. 2014, 16 pages.

Day, et al., "Using Cloud FastPath to Create Data Streams", https://cloud.google.com/solutions/partners/using-cloud-fastpath-to-create-data-streams, Published on: Oct. 4, 2016, 12 pages.

Liua, et al., "Synchronizing Parallel Data Streams via Cross-Stream Coding", In International Conference on Networking, Architecture, and Storage, Jul. 9, 2009, pp. 1-8.

Mangalam, Harry, "How to transfer large amounts of data via network", http://moo.nac.uci.edu/~hjm/HOWTO_move_data.html, Published on: Jul. 5, 2016, 29 pages.

Wang, et al., "Move data to and from an on-premises file system by using Azure Data Factory", https://azure.microsoft.com/en-in/documentation/articles/data-factory-onprem-file-system-connector/, Published on: Sep. 1, 2016, 51 pages.

* cited by examiner

OPTIMIZED SYNCING OF METADATA CHANGES USING CHUNKED RESPONSE

BACKGROUND

When syncing metadata of large hierarchical datasets, delta sync technology may be used. Current delta sync technology requires many sequential roundtrips back and forth between a server and a client or one roundtrip with a large payload size. However, requiring many sequential roundtrips back and forth between the server and the client is a severe limitation on platforms where CPU time is expensive and limited as some compute time is needed to process the results of the first page and issue the next page. Furthermore, having one large page size is a limitation, particularly in scenarios where the network is interrupted as the expensive network call has to be made again. Additionally, in a scenario where the network connection is spotty, the one large page size may never succeed. As such, current delta sync technology is expensive and requires significant resources for the client.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for optimizing syncing of metadata changes using a chunked response. In one aspect, an application of a client computing device may be launched. A single streaming request may be sent to an application service for updated metadata of a dataset. A response to the single streaming request may be received at the client computing device. The response may include the updated metadata of the dataset, where the updated metadata is represented as a plurality of pages. When the application has access to processing cycles of at least one processor, each page of the plurality of pages may be processed as the response to the single streaming request is received.

In another aspect, a method for synchronizing a dataset in a client computing device is presented. In one example, an application may be launched in a foreground of a client computing device. A single streaming request may be sent to an application service for updated metadata of a dataset while the application is running in the foreground. A response to the single streaming request may be received at the client computing device. The response may include the updated metadata of the dataset, where the updated metadata is represented as a plurality of pages. While the application is running in a background of the client computing device, each page of the plurality of pages may be processed as the response to the single streaming request is received.

In a further aspect a system may comprise at least one processor and memory encoding computer executable instructions that, when executed by the at least one processor, perform a method for resuming syncing of updated metadata of a dataset. In one example, a response to a first single streaming request issued by an application for the updated metadata of the dataset may be received. The updated metadata may be represented as a plurality of pages. Each page of the plurality of pages of updated metadata may be processed as the response to the single streaming request is received. Upon a network error occurring while receiving the response to the first single streaming request, a last processed page of the plurality of pages of updated metadata may be identified. Subsequent to the network error occurring, the application may be launched. A second single streaming request for the updated metadata of the dataset represented by each page of the plurality of pages remaining after the last processed page of the plurality of pages of updated metadata may be sent.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
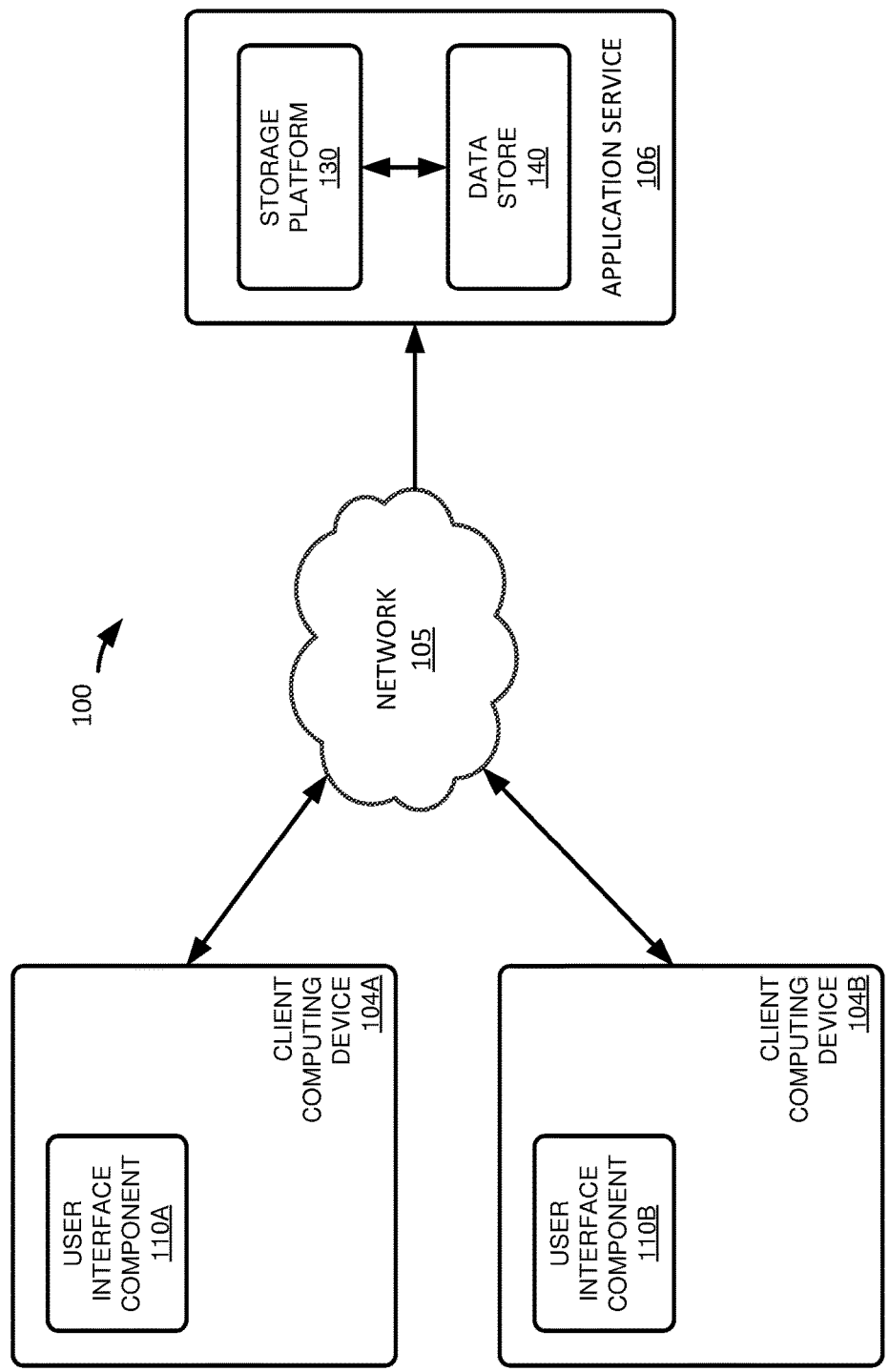
FIG. 1 illustrates an exemplary syncing system, according to an example aspect.

Aspects of the disclosure are generally directed to optimizing syncing of metadata changes of large datasets using a chunked response. For example, when an application is launched at a client computing device, the application may send a single streaming request to a service for updated metadata associated with a dataset. The service may send the updated metadata associated with the dataset as a single response with the updated metadata represented as pages. For example, the updated metadata may be broken up into chunks of metadata, where each chunk is one page in the response. In this regard, the response may include a plurality of pages of updated metadata. The client computing device processes each page of the plurality of pages of updated metadata as the client receives the response. In this regard, the technology of the present disclosure provides the benefit of sending a single streaming request for updated metadata of a large dataset, while processing the response in chunks/pages. In turn, no additional compute time is needed at the client and if a network error occurs while processing the response, the client can resume syncing the updated metadata where it left off.

As discussed above, current delta sync technology requires many sequential roundtrips back and forth between a server and a client or one roundtrip with a large payload size. However, requiring many sequential roundtrips back and forth between the server and the client is a severe limitation on platforms where CPU time is expensive and limited as some compute time is needed to process the results of the first page and issue the next page. Furthermore, having one large page size is a limitation, particularly in scenarios where the network is interrupted as the expensive network call has to be made again. Additionally, in a scenario where the network connection is spotty, the one large page size may never succeed. As such, current delta sync technology is expensive and requires significant resources for the client.

Accordingly, aspects described herein include syncing updated metadata using a chunked response. As discussed above, when an application is launched at a client computing device, the application may send a single streaming request to a service for updated metadata (e.g., changes in metadata) associated with a dataset. In one example, the service is an application service. In some examples, the application is launched in a foreground of the client computing device. In other examples, the application is launched in a background of the client computing device. A response to the single streaming request for updated metadata may be received at the client computing device. The response may include the updated metadata of the dataset represented as a plurality of pages. For example, the updated metadata may be chunked into pages where each chunk of updated metadata is one page of the plurality of pages. Each page of the plurality of pages may be processed as the response to the single streaming request is received at the client computing device. In some examples, each page of the plurality of pages may be processed as the response to the single streaming request is received while the application is running in a background of the client computing device. In other examples, each page of the plurality of pages may be processed as the response to the single streaming request is received while the application is running in a foreground of the client computing device. In yet other examples, the response to the single streaming request is received while the application is not running. In this example, the operating system of the client computing device may receive the response to the single streaming request. When the application has access to processing cycles, the application may begin and/or resume processing each page of the plurality of pages received in the response to the single streaming request. In this regard, a user may launch the application, a request may be sent to the service for updated metadata, the user may close the application, and the response may be received and processed (e.g., page by page). In contrast, delta sync operations described in the prior art herein require many sequential roundtrips between client and server or processing one large page size in the response.

In aspects, syncing of updated metadata in a chunked response may be resumed (e.g., when a network error occurs). In one example, a response to a first single streaming request issued by an application for the updated metadata of the dataset may be received. The response may be processed in chunks of updated metadata (e.g., one page at a time) as the response to the single streaming request is received. Upon a network error occurring while receiving the response to the first single streaming request, a last processed page of the plurality of pages of updated metadata may be identified. In some examples, the last processed page of the plurality of pages may be identified using a sync token. Subsequent to the network error occurring, the application may be launched again. A second single streaming request for the updated metadata of the dataset represented by each page of the plurality of pages remaining after the last processed page of the plurality of pages of updated metadata may be sent. As such, subsequent to the network error occurring, the client computing device may resume processing the updated metadata where it left off (e.g., starting with the pages of updated metadata remaining after the last processed page from the first request/response for updated metadata).

As such, the technology of the present disclosure facilitates syncing metadata changes in large datasets using a chunked response in an inexpensive manner and so that client compute resources are reduced. In this regard, a technical effect that may be appreciated is that by syncing metadata changes in large datasets using a chunked response in an inexpensive manner and so that client compute resources are reduced, processor load may be reduced, memory may be conserved, and network bandwidth usage may be reduced. Another technical effect that may be appreciated is that compute limited devices (e.g., such as a mobile device) may use the technology of the present disclosure facilitating a compelling visual and functional experience to allow users to efficiently view and interact with a user interface to quickly, easily, and efficiently view and interact with data of an application.

Referring now to the drawings, in which like numerals represent like elements through the several figures, aspects of the present disclosure and the exemplary operating environment will be described. With reference to FIG. 1, one aspect of a syncing system 100 for syncing updated metadata using a chunked response is illustrated. In aspects, the syncing system 100 may include client computing devices 104A-104B and an application service 106. In a basic configuration, the client computing devices 104A-104B may be a handheld computer having both input elements and output elements. The client computing devices 104A-104B may be any suitable computing device for implementing the syncing system 100 for syncing updated metadata using a chunked response. For example, the client computing devices 104A-104B may be at least one of: a mobile telephone; a smart phone; a tablet; a phablet; a smart watch; a wearable computer; a personal computer; a desktop computer; a laptop computer; a gaming device/computer (e.g., Xbox); a television; and etc. In some examples, the client computing devices 104A-104B may be compute limited client computing devices. For example, a compute limited client computing device may be a client computing device including a CPU with limited compute cycles (e.g., a mobile device with a particular operating system). In one example, a compute limited client computing device may include an iOS® mobile platform. This list is exemplary only and should not be considered as limiting. Any suitable client computing devices 104A-104B for implementing the syncing system 100 for syncing updated metadata using a chunked response may be utilized.

In aspects, the application service 106 may provide data to and from the client computing devices 104A-104B through a network 105. In aspects, the syncing system 100 may be implemented on more than one application service 106, such as a plurality of application service 106. As discussed above, the application service 106 may provide data to and from the client computing devices 104A-104B through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. The data may be communicated in accordance with various communication protocols, combinations of protocols, or variations thereof. In one example, the data may be communicated in accordance with the HTTPS (Secure Hypertext Transfer Protocol).

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As discussed above, the syncing system 100 may include client computing devices 104A-104B and an application service 106. The various components may be implemented using hardware, software, or a combination of hardware and software. The syncing system 100 may be configured to sync updated metadata using a chunked response. In this regard, updated metadata may be synced across the client computing devices 104A-104B. In one example, metadata may include information about data (e.g., items, files, etc.) such as a name, size, timestamp, hash, type of activity (e.g., edit, delete, creation), and the like. In another example, metadata may include information about data such as themes, permission settings, and the like. In some examples, the metadata such as themes, permission settings, and the like, may be metadata inherited by all children of a parent in a hierarchical dataset. For example, metadata inherited by all children of a parent in a hierarchical dataset may include the items, files, etc., within the hierarchical dataset that are impacted by a metadata change on a parent in the hierarchical dataset. A hierarchical dataset may include a hierarchy of items, files, etc., including one or more parent nodes and one or more children nodes. In some examples, a child node of a first parent node may be a second parent node to other children nodes within the hierarchy. That is, a child node may serve as both a child node and a parent node in the hierarchy and a parent node may serve as both a parent node and child node in the hierarchy.

As illustrated in FIG. 1, the client computing devices 104A-104B include user interface components 110A-110B. In some examples, the user interface components 110A-110B may be configured to display an application for accessing and/or interacting with a dataset, for example. In one example, an application may include any application suitable for accessing datasets such as collaboration applications, email applications, chat applications, voice applications, and the like. In one example, a collaboration application may include an application such as a OneDrive application and a SharePoint application. In one case, items and/or files associated with the application and included in the dataset may include items and/or files such as word documents, spreadsheets, electronic slide presentations, emails, chat conversations, media files, and the like. In one example, the application is displayed in the user interface via the user interface components 110A-110B when the application is launched. In one example, the application may be opened and launched when an indication of interest made with respect to an icon representing the application is received at the user interface of the client computing devices 104A-104B. In one example, an indication of interest may include touching, clicking on, audibly referencing, pointing to, selecting, and/or any indication of an interest in or selection of the icon representing the application.

In some examples, the application is launched in the foreground of the client computing devices 104A-104B. For example, the application is launched such that a user may interact with the application and view data associated with the application. In aspects, when the application is launched in the foreground of the client computing devices 104A-104B, the application may send a single streaming request to the application service 106 for updated metadata of a dataset while the application is running in the foreground. In other examples, the application is launched in the background of the client computing devices 104A-104B. For example, the operating system of the client computing devices 104A-104B may automatically launch the application in the background (e.g., while the application is not visible to a user). In aspects, when the application is launched in the background of the client computing devices 104A-104B, the application may send a single streaming request to the application service 106 for updated metadata of a dataset while the application is running in the background. In one example, the dataset is a file system associated with the application. A single streaming request may be one network call by the client computing device/application for the updated metadata. In one example, the updated metadata includes metadata changes that occurred since a last request was sent to the application service for updated metadata of the dataset. In this regard, the requested metadata may include the changes that have occurred in a dataset since a last syncing operation was performed.

In another example, the updated metadata includes metadata changes that have not been processed by the client computing devices 104A-104B. For example, after the single streaming request is sent to the application service 106 for updated metadata, a response to the single streaming request may be received at the client computing device (e.g., 104A-104B). The updated metadata included in the response may be represented as a plurality of pages. In this regard, each page of the plurality of pages may be processed as the response to the single streaming request is received. In one example, each page of the plurality of pages includes a sync token. The sync token may indicate the last metadata update that is processed as the response to the single streaming request is received. In one case, a network error may occur while receiving the response to the single streaming request. A network error may include any network error that results in the client computing device no longer receiving the response to the single streaming request such as a network interruption, a network disconnection, a weak network connection, and the like. Upon a network error occurring while receiving the response to the single streaming request, a last processed page of the plurality of pages of updated metadata may be identified. Subsequent to the network error occurring, the application may be launched again.

When the application is launched again, another (e.g., an additional) single streaming request for the updated metadata of the dataset may be sent. The updated metadata (e.g., based on the additional single streaming request) may be represented by each page of the plurality of pages remaining after the last processed page of the plurality of pages of updated metadata. In this regard, the updated metadata includes metadata changes that have not been processed by the client computing device (e.g., the updated metadata includes the remaining updated metadata that is not processed and received in the response to the initial single streaming request). In another example, the updated metadata may include the remaining updated metadata that is not processed and received in the response to the initial single streaming request plus any additional metadata changes that have occurred since sending the single streaming request for updated metadata. In one example, a change made to the dataset at the client computing device 104A may be synced with and consumed by the client computing device 104B, and vice versa. In this regard, syncing of large datasets may be optimized across multiple endpoints (e.g., client computing devices 104A-104B) according to the present disclosure.

In one example, the user interface components 110A-110B may be a touchable user interface that is capable of receiving input via contact with a screen of the client computing devices 104A-104B, thereby functioning as both an input device and an output device. For example, content may be displayed, or output, on the screen of the client computing devices 104A-104B and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface components 110A-110B may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing devices 104A-104B, thereby functioning as both an input device and an output device. For example, content may be displayed, or output, on the screen of the client computing devices 104A-104B and input may be received by contacting the screen using a cursor, for example. In this regard, contact may include, for example, placing a cursor on the non-touchable user interface using a device such as a mouse.

In some aspects, the application service 106 may include a storage platform 130 and a data store 140. In one example, the storage platform 130 may be configured to store, manage, and access data and/or information associated with the syncing system 100. For example, the storage platform 130 may store one or more items, files and/or metadata and/or updated metadata associated with a dataset in a data store 140. In one example, data store 140 may be part of and/or located at the storage platform 130. In another example, data store 140 may be a separate component and/or may be located separate from the storage platform 130. It is appreciated that although one application service 106 is illustrated in FIG. 1, the syncing system 100 may include a plurality of application services 106 with a plurality of storage platforms 130 and a plurality of data stores 140. In some cases, the application service 106 may include a plurality of storage platforms 130 and a plurality of data stores 140. For example, the plurality of storage platforms 130 may include at least file storage providers, external activity services and document editing clients. In one example, the storage platform 130 and/or the application service 106 may be cloud storage services such as OneDrive, SharePoint, Google Drive, Dropbox, and the like.

The examples described herein are exemplary only and should not be considered as limiting. For example, while various datasets, items, files, applications, and metadata are described herein, it is appreciated that any number of datasets, items, files, applications, and metadata for efficiently syncing updated metadata using a chunked response. Furthermore, any combination of the datasets, items, files, applications, and metadata described herein may be used for efficiently syncing updated metadata using a chunked response.

Figure 2A:
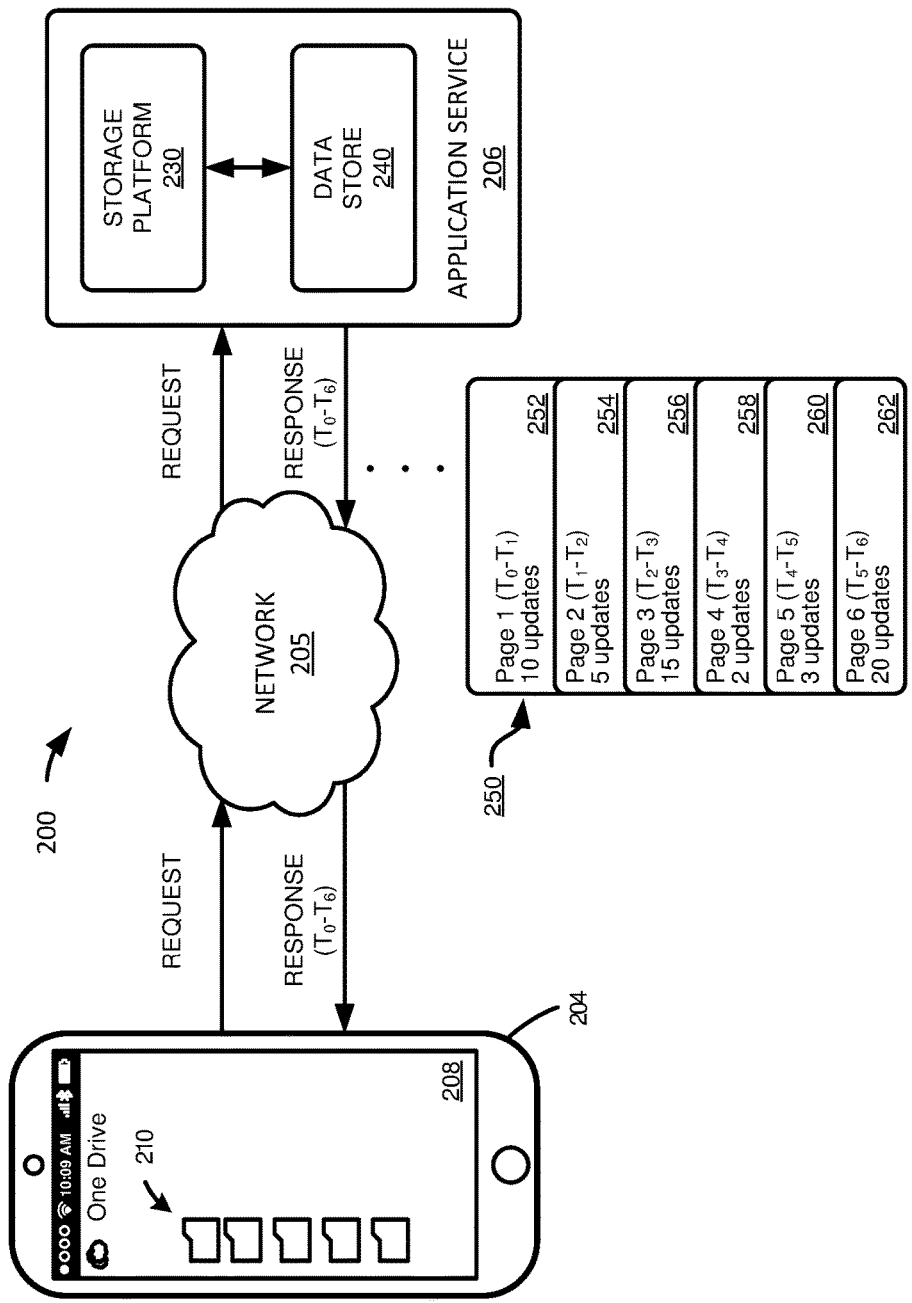
FIG. 2A illustrates one phase of syncing metadata changes using an exemplary syncing system, according to an example aspect.

FIG. 2A illustrates one phase of syncing metadata changes using an exemplary syncing system 200, according to an example aspect. The exemplary syncing system 200 may be configured to sync updated metadata using a chunked response. The exemplary syncing system 200 may include a client computing device 204, a network 205, an application service 206, and a data log 250. The client computing device 204, the network 205, and the application service 206 may include the functionality described herein relative to the client computing devices 104A-104B, the network 105, and the application service 106 of FIG. 1. For example, the client computing device 204 may be any suitable computing device for implementing the syncing system 100 for syncing updated metadata using a chunked response. For example, the client computing device 204 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. In some examples, the client computing device 204 may be compute limited client computing devices. For example, a compute limited client computing device may be a client computing device including a CPU with limited compute cycles (e.g., a mobile device with a particular operating system). In one example, a compute limited client computing device may include an iOS® mobile platform. This list is exemplary only and should not be considered as limiting. Any suitable client computing device 204 for implementing the syncing system 100 for syncing updated metadata using a chunked response may be utilized.

In aspects, the application service 206 may provide data to and from the client computing device 204 through a network 205. In aspects, the syncing system 200 may be implemented on more than one application service 206, such as a plurality of application services 206. As discussed above, the application service 206 may provide data to and from the client computing device 204 through the network 205. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. The data may be communicated in accordance with various communication protocols, combinations of protocols, or variations thereof. In one example, the data may be communicated in accordance with the HTTPS (Secure Hypertext Transfer Protocol).

In some aspects, the application service 206 may include a storage platform 230 and a data store 240. In one example, the storage platform 230 may be configured to store, manage, and access data and/or information associated with the syncing system 200. For example, the storage platform 230 may store the data log 250, one or more items, files, and/or metadata and/or updated metadata associated with a dataset in a data store 240. In one example, data store 240 may be part of and/or located at the storage platform 230. In another example, data store 240 may be a separate component and/or may be located separate from the storage platform 230. It is appreciated that although one application service 206 is illustrated in FIG. 2A, the syncing system 200 may include a plurality of application services 206 with a plurality of storage platforms 230 and a plurality of data stores 240. In some cases, the application service 206 may include a plurality of storage platforms 230 and a plurality of data stores 240. For example, the plurality of storage platforms 230 may include at least file storage providers, external activity services and document editing clients. In one example, the storage platform 230 and/or the application service 206 may be cloud storage services such as OneDrive, SharePoint, Google Drive, Dropbox, and the like.

The exemplary client computing device 204, as illustrated in FIG. 2A, is a mobile phone. As illustrated in FIG. 2A, the client computing device 204 includes an application 208. The exemplary application 208, as shown in FIG. 2A, is OneDrive. The exemplary application 208 includes a dataset 210. The dataset 210 illustrated in FIG. 2A includes a folder tree of a file system of the application 208. In one example, the application 208 is displayed in a user interface of the client computing device 204 in response to launching the application 208. In this example, the application 208 is launched in the foreground of the client computing device 204. A single streaming request may be sent to the application service 206 for updated metadata of the dataset 210. In one example, the single streaming request for updated metadata of the dataset 210 is sent to the application service 206 in response to launching the application 208.

In some examples, the updated metadata may include metadata changes that occurred between a first time and a second time. In one example, the first time may be the time that a first metadata change occurred after the time of a metadata change that is last processed by the client computing device 204 (e.g., as indicated by the sync token described herein). For example, if the time of a metadata change that is last processed by the client computing device 204 is 10 PM on Dec. 15, 2015 and the next metadata change to the dataset is at 12 AM on Dec. 16, 2016, the first time is 12 AM, Dec. 16, 2015. In this example, the sync token timestamp is 10 PM, Dec. 15, 2015 (e.g., 10 PM, Dec. 15, 2015 is the last metadata update that is processed). In another example, the second time may be the time that a last metadata change occurred before the single streaming request for updated metadata is sent to the application service 206. For example, if the single streaming request for updated metadata is sent to the application service 206 at 10 PM on Dec. 18, 2015 and the time of the last metadata change that occurred before 10 PM on Dec. 18, 2015 is 8 PM on Dec. 18, 2015, the second time is 8 PM on Dec. 18, 2015. Using the example described herein, the updated metadata may include metadata changes that occurred between 12 AM, Dec. 16, 2015 and 8 PM on Dec. 18, 2015.

In the example illustrated in FIG. 2A, the response to the single streaming request received at the client computing device 204 includes updated metadata that occurred between a first time $T_0$ and a second time $T_6$. In one example, the updated metadata is represented as a plurality of pages. As illustrated in FIG. 2A, the data log 250 includes the updated metadata represented as a plurality of pages. In particular, in the example illustrated in FIG. 2A, the data log 250 includes six pages of updated metadata. The six pages of updated metadata include a first page 252, a second page 254, a third page 256, a fourth page 258, a fifth page 260, and a sixth page 262. In some examples, each page of the plurality of pages includes metadata changes that occurred in a time span within the first time and the second time. For example, the first page 252 includes updated metadata from time $T_0$ to $T_1$. In the example illustrated in FIG. 2A, the first page 252 includes 10 metadata updates. In another example, the second page 254 includes updated metadata from time $T_1$ to $T_2$. In the example illustrated in FIG. 2A, the second page 254 includes 5 metadata updates. In another example, the third page 256 includes updated metadata from time $T_2$ to $T_3$. In the example illustrated in FIG. 2A, the third page 256 includes 15 metadata updates. In another example, the fourth page 258 includes updated metadata from time $T_3$ to $T_4$. In the example illustrated in FIG. 2A, the fourth page 258 includes 2 metadata updates. In another example, the fifth page 260 includes updated metadata from time $T_4$ to $T_5$. In the example illustrated in FIG. 2A, the fifth page 260 includes 3 metadata updates. In another example, the sixth page 262 includes updated metadata from time $T_5$ to $T_6$. In the example illustrated in FIG. 2A, the sixth page 262 includes 20 metadata updates. Each page of the plurality of pages may be processed by the client computing device 204 as the response to the single streaming request is received.

Figure 2B:
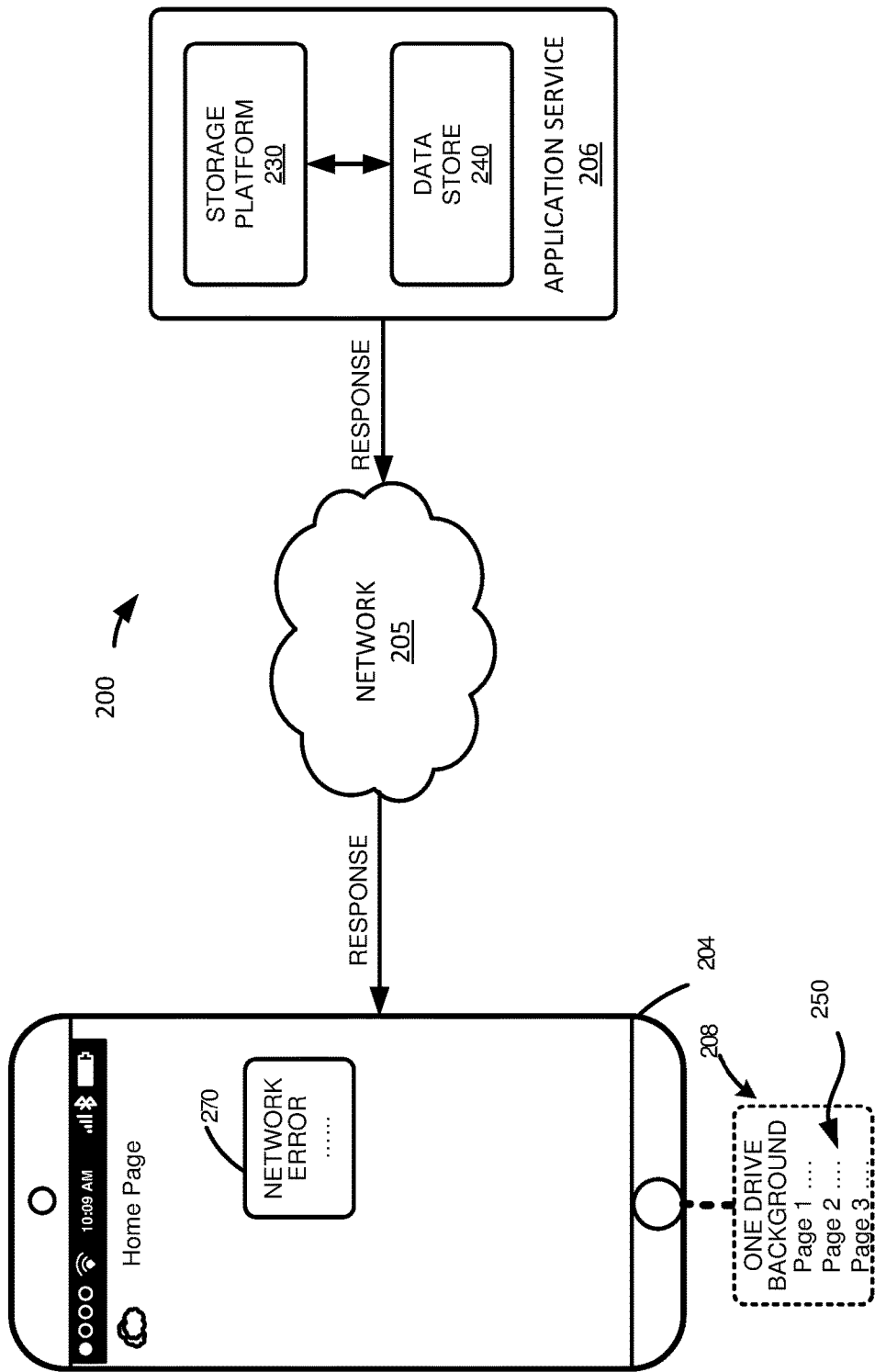
FIG. 2B illustrates one phase of syncing metadata changes using the exemplary syncing system of FIG. 2A, according to an example aspect.

Referring now to FIG. 2B, one phase of syncing metadata changes using the exemplary syncing system 200 is illustrated, according to an example aspect. As discussed above, the exemplary syncing system 200 includes the client computing device 204, the network 205, the application service 206, and the data log 250. In one example, the client computing device 204 may process each page of the plurality of pages as the response to the single streaming request is received while the application 208 is running in the background of the client computing device 204. In another example, the client computing device 204 may process each page of the plurality of pages as the response to the single streaming request is received while the application 208 is running in the foreground of the client computing device 204. In another example, the client computing device 204 may process each page of the plurality of pages when the application 208 has access to processing cycles of at least one processor of the client computing device 204. As illustrated in FIG. 2B, the application 208 is running in the background of the client computing device 204. As the application 208 runs in the background of the client computing device 204, the client computing device 204 and/or the application 208 processes each page of the plurality of pages of updated metadata in the data log 250. In the example illustrated in FIG. 2B, as the application 208 processes each page of the plurality of pages of updated metadata in the data log 250, a network error 270 occurs. Upon the network error 270 occurring, a last processed page of the plurality of pages of updated metadata may be identified. In the example illustrated in FIG. 2B, the last processed page of updated metadata identified is the third page.

Figure 2C:
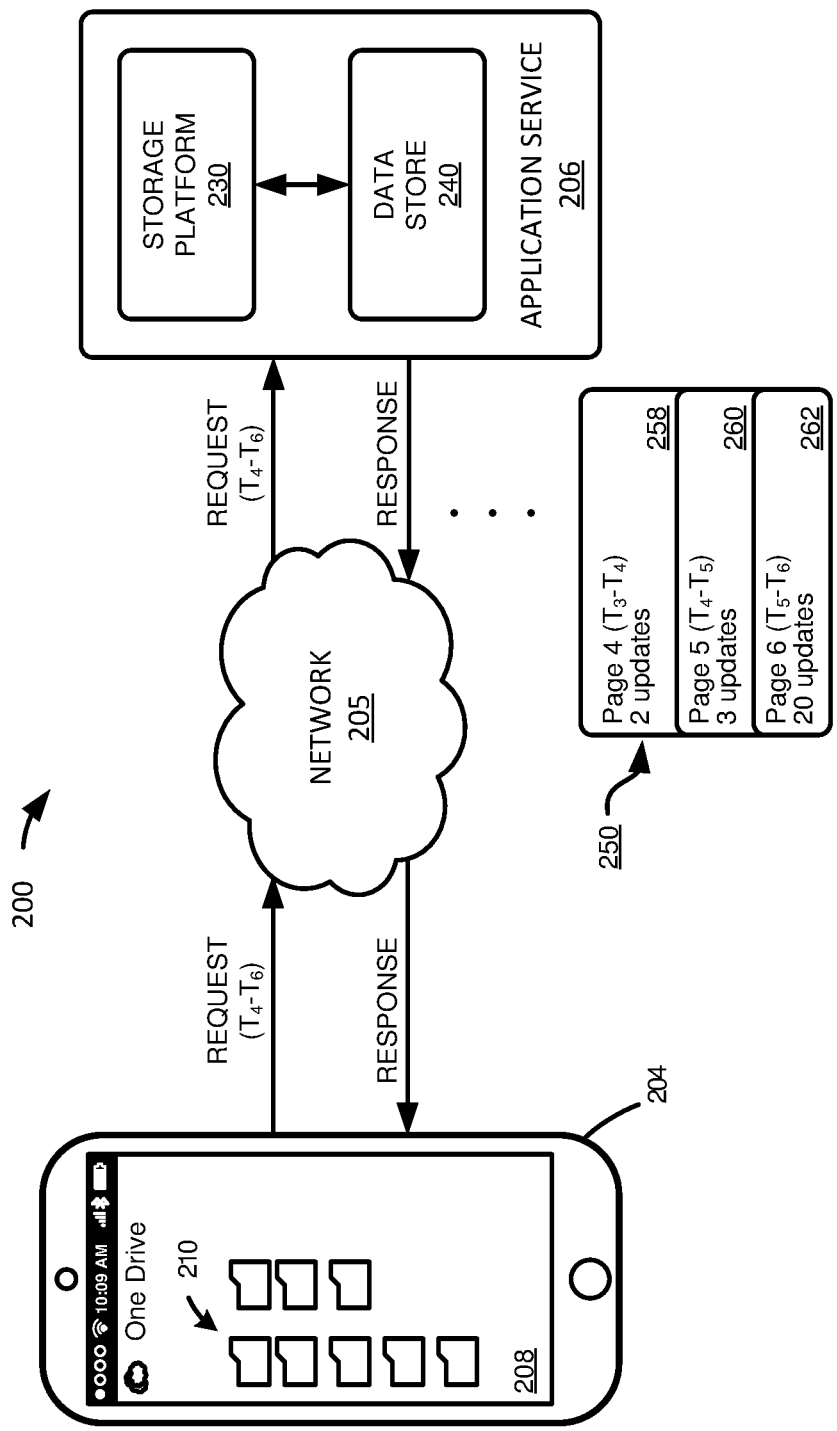
FIG. 2C illustrates one phase of syncing metadata changes using the exemplary syncing system of FIG. 2A, according to an example aspect.

Referring now to FIG. 2C, one phase of syncing metadata changes using the exemplary syncing system 200 is illustrated, according to an example aspect. As discussed above, the exemplary syncing system 200 includes the client computing device 204, the network 205, the application service 206, and the data log 250. In one example, subsequent to the network error 270 occurring, the application 208 may be launched again. As illustrated in FIG. 2C, another (e.g., a second) single streaming request for the updated metadata of the dataset 210 is sent to the application service 206. The second single streaming request is for the updated metadata remaining after the last processed metadata update/change from the response to the initial single streaming request (e.g., as described relative to FIG. 2A). As illustrated in FIG. 2C, the request for updated metadata is for updated metadata that occurred between time $T_4$ and $T_6$. In this regard, the updated metadata is represented by each page of the plurality of pages remaining after the last processed page of the plurality of pages of updated metadata. In the example illustrated in FIGS. 2A-2C, the last processed page of updated metadata that was processed is the third page 256 of updated metadata. In this regard, the response to the second single streaming request includes the data log 250 with the fourth page 258, the fifth page 260, and the sixth page 262 of updated metadata. The client computing device 204 may receive the response to the second single streaming request, where the updated metadata is represented by each page of the plurality of pages remaining after the last processed page of the plurality of pages of updated metadata. The client computing device 204 may process the remaining pages as the response to the second single streaming request is received. As such, the client computing device 204 resumes syncing of updated metadata where it left off and is not required to send a request for the entire network response from the initial single streaming request.

It is appreciated that while FIGS. 2A-2C illustrate various phases of syncing metadata changes using the exemplary syncing system 200, client computing device 204, application service 206, network 205, application 208, dataset 210, data log 250, and a plurality of pages of updated metadata, the various phases of syncing metadata changes using the exemplary syncing system 200, client computing device 204, application service 206, network 205, application 208, dataset 210, data log 250, and a plurality of pages of updated metadata is exemplary only and should not be considered as limiting. Any suitable number and/or type of devices, services, networks, applications, files, datasets, data logs, and pages of updated metadata may be utilized in conjunction with the present disclosure. Furthermore, while a particular number of updates are included in each page of the data log 250, the number of updates is exemplary only and should not be considered as limited. Any number of metadata updates may be included in each page of the plurality of pages of updated metadata.

Figure 3:
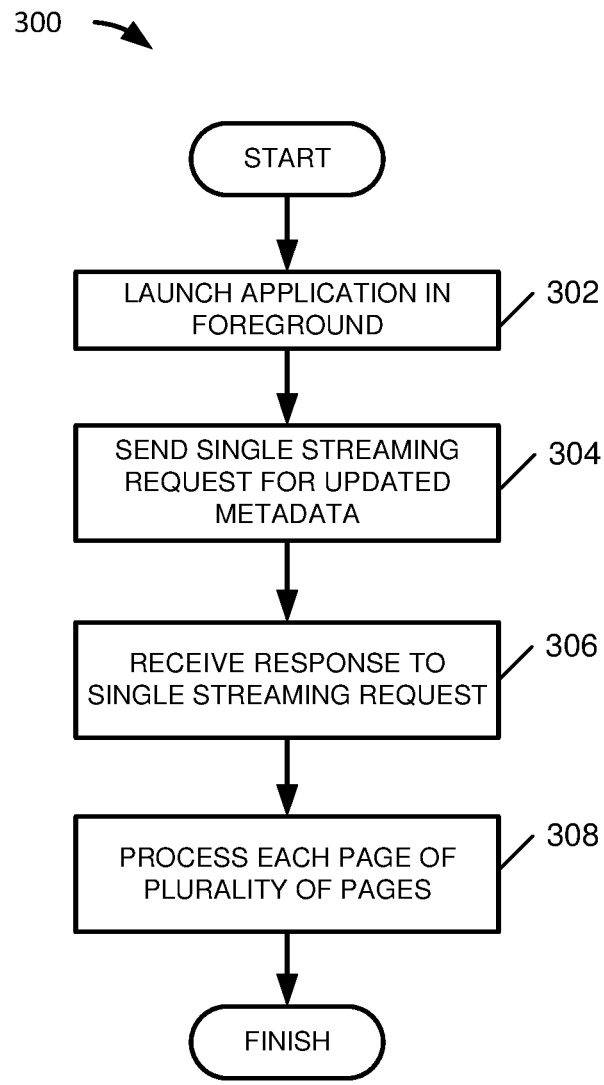
FIG. 3 illustrates an exemplary method for synchronizing a dataset in a client computing device, according to an example aspect.

Referring now to FIG. 3, an exemplary method 300 for synchronizing a dataset in a client computing device, according to an example aspect is shown. Method 300 may be implemented on a computing device or a similar electronic device capable of executing instructions through at least one processor. Method 300 may begin at operation 302, where an application may be launched in the foreground of a client computing device. In one example, the application may be launched in response to receiving an indication of interest made with respect to an icon representing the application at user interface of the client computing device. In one example, an indication of interest may include touching, clicking on, audibly referencing, pointing to, selecting, and/or any indication of an interest in or selection of the icon representing the application. In one example, an application may include any application suitable for accessing datasets such as collaboration applications, email applications, chat applications, voice applications, and the like. In one example, a collaboration application may include an application such as a OneDrive application and a SharePoint application.

When the application is launched in the foreground of the client computing device, flow proceeds to operation 304 where a single streaming request is sent to an application service for updated metadata of the dataset while the application is running in the foreground. In one example, the updated metadata includes metadata changes that occurred since a last request was sent to the application service for updated metadata of the dataset. In another example, the updated metadata includes metadata changes that have not been processed by the client computing device. In another example, the updated metadata includes metadata changes that occurred between a first time and a second time. In one example, the single streaming request is one network call to the application service.

After a single streaming request is sent to an application service for updated metadata of the dataset while the application is running in the foreground, flow proceeds to operation 306 where a response to the single streaming request is received. For example, the response to the single streaming request is received at the client computing device. In one example, the response includes the updated metadata of the dataset. In another example, the updated metadata is represented by a plurality of pages. In one example, each page of the plurality of pages includes a sync token. The sync token may indicate a last metadata update that is processed as the response to the single streaming request is received. In some examples, each page of the plurality of pages includes metadata changes that occurred in a time span within the first time and the second time.

When a response to the single streaming request is received, flow proceeds to operation 308 where each page of the plurality of pages is processed as the response to the single streaming request is received. In one example, each page of the plurality of pages is processed as the response to the single streaming request is received while the application is running in the background. In this regard, a user of the client computing device and/or application may utilize the client computing device while the application is running in the background and processing the response to the single streaming request. In one example, upon a network error occurring while receiving the response to the single streaming request, a last processed page of the plurality of pages of updated metadata may be identified. Subsequent to the network error occurring, the application may be launched again. For example, subsequent to the network error occurring, a user of the client computing device may decide to open and launch the application again. When the application is launched again, another single streaming request for updated metadata of the dataset may be sent to the application service. The request may be sent for the updated metadata remaining after the last metadata update processed by the client computing device. In this regard, the updated metadata may be represented by each page of the plurality of pages remaining after the last processed page of the plurality of pages of metadata.

Figure 4:
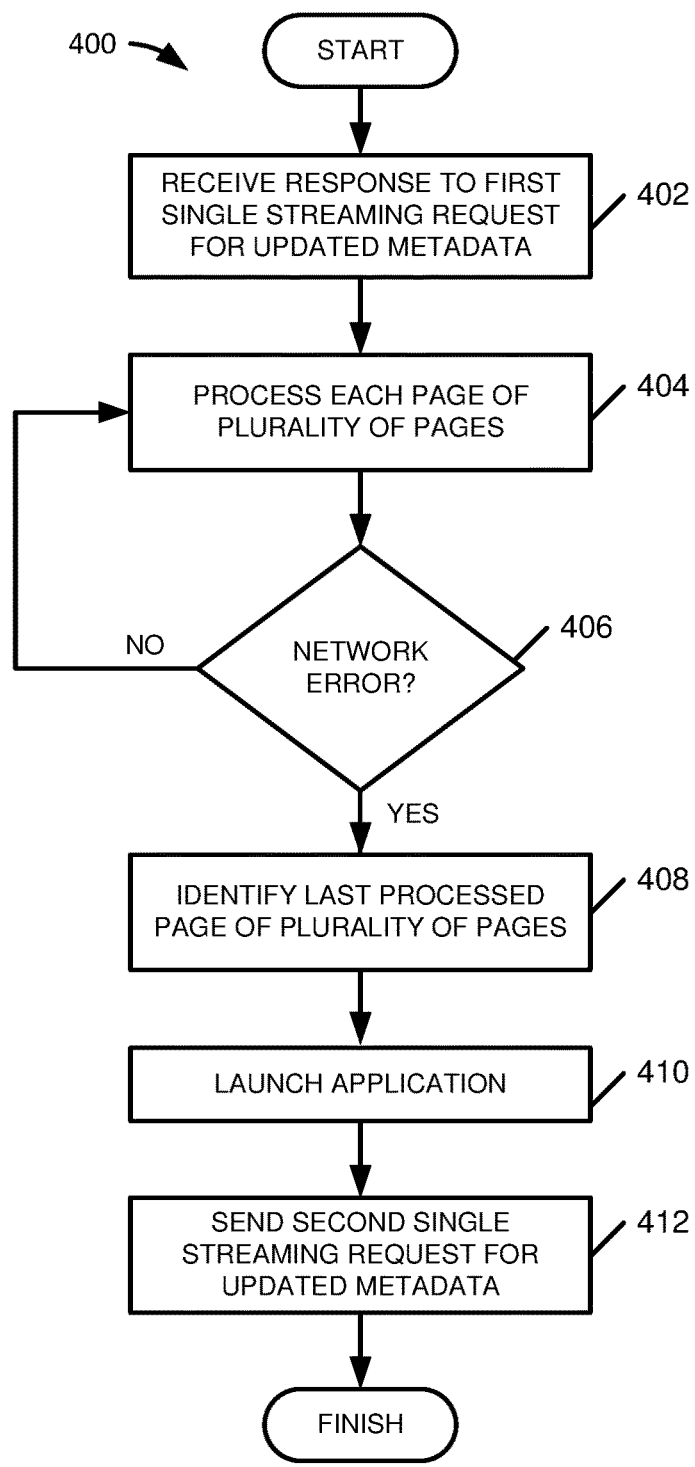
FIG. 4 illustrates an exemplary method for resuming syncing of updated metadata of a dataset, according to an example aspect.

Referring now to FIG. 4, an exemplary method 400 for resuming syncing of updated metadata of a dataset, according to an example aspect is shown. Method 400 may be implemented on a computing device or a similar electronic device capable of executing instructions through at least one processor. Method 400 begins at operation 402 where a response to a first single streaming request issued by an application for updated metadata of the dataset is received. In one example, the application is a collaboration application. In one example, the updated metadata is represented by a plurality of pages. In one example, each page of the plurality of pages includes a sync token. The sync token may indicate a last metadata update that is processed as the response to the single streaming request is received. In some examples, each page of the plurality of pages includes metadata changes that occurred in a time span within a first time and a second time.

When a response to a first single streaming request issued by an application for updated metadata of the dataset is received, flow proceeds to operation 404 where each page of the plurality of pages of updated metadata is processed as the response to the first single streaming request is received. In one example, each page of the plurality of pages of updated metadata is processed as the response to the first single streaming request is received while the application is running in the background. In this regard, a user of the client computing device and/or application may utilize the client computing device while the application is running in the background and processing the response to the first single streaming request. In one example, the updated metadata includes metadata changes that occurred since a last request was sent to the application service for updated metadata of the dataset. In another example, the updated metadata includes metadata changes that have not been processed by the client computing device. In another example, the updated metadata includes metadata changes that occurred between a first time and a second time. In one example, the updated metadata may include information about data (e.g., items, files, etc.) such as a name, size, timestamp, hash, type of activity (e.g., edit, delete, creation), and the like. In another example, metadata may include information about data such as themes, permission settings, and the like.

While each page of the plurality of pages of updated metadata is processed as the response to the first single streaming request is received, flow proceeds to decision operation 406 where it is determined whether a network error has occurred. When it is determined that a network error has not occurred, flow proceeds back to operation 404 where each page of the plurality of pages of updated metadata continues to be processed as the response to the first single streaming request is received. When it is determined that a network error has occurred, flow proceeds to operation 408 where a last processed page of the plurality of pages of updated metadata is identified. For example, as discussed herein, each page of the plurality of pages may include a sync token. The sync token may indicate a last metadata update that is processed as the response to the single streaming request is received. In this regard, the last metadata update that is processed as the response to the single streaming request is received may be included in a page of the plurality of pages of updated metadata. As such, in one example, the last processed page of the plurality of pages of updated metadata may be identified using the sync token.

Subsequent to the network error occurring, flow proceeds to operation 410 where the application is launched again. For example, a user of the client computing device may open and launch the application again at some point in time after the network error occurs. In one example, the application is launched in the foreground of a client computing device. In one example, the application may be launched in response to receiving an indication of interest made with respect to an icon representing the application at user interface of the client computing device. In one example, an indication of interest may include touching, clicking on, audibly referencing, pointing to, selecting, and/or any indication of an interest in or selection of the icon representing the application. In one example, an application may include any application suitable for accessing datasets such as collaboration applications, email applications, chat applications, voice applications, and the like. In one example, a collaboration application may include an application such as a OneDrive application and a SharePoint application.

When the application is launched, flow proceeds to operation 412 where a second single streaming request for the updated metadata of the dataset is sent. In one example, the second single streaming request for the updated metadata is sent to an application service. In one example, the updated metadata includes metadata changes that have not been processed by the client computing device. In this regard, the updated metadata of the dataset may be represented by each page of the plurality of pages remaining after the last processed page of the plurality of pages of updated metadata. In one example, a response to the second single streaming request is received. The response may include the updated metadata of the dataset represented by each page of the plurality of pages remaining after the last processed page of the plurality of pages of updated metadata. Each page of the plurality of pages of updated metadata may be processed as the response to the second single streaming request is received.

Figure 5:
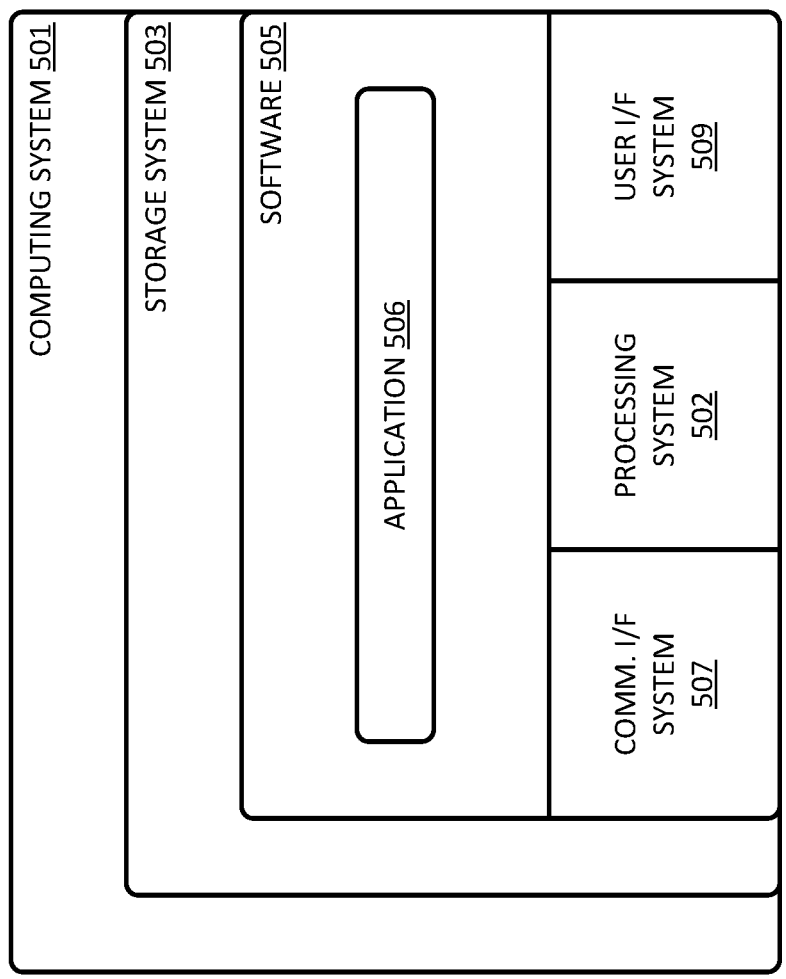
FIG. 5 illustrates a computing system suitable for implementing the enhanced metadata syncing technology disclosed herein, including any of the environments, architectures, elements, processes, user interfaces, and operational scenarios and sequences illustrated in the Figures and discussed below in the Technical Disclosure.

FIG. 5 illustrates computing system 501 that is representative of any system or collection of systems in which the various applications, services, scenarios, and processes disclosed herein may be implemented. Examples of computing system 501 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes application 506, which is representative of the applications discussed with respect to the preceding FIGS. 1-4. When executed by processing system 502 to enhance syncing of updated metadata, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced metadata syncing systems.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software, in addition to or that include application 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced metadata syncing systems. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising one or more computer readable storage media; and program instructions stored on the one or more computer readable storage media that, when executed by at least one processor, cause the at least one processor to at least: launch an application of a client computing device; send a single streaming request to an application service for updated metadata of a dataset; receive a response to the single streaming request, the response including the updated metadata of the dataset, where the updated metadata is represented as a plurality of pages; and when the application has access to processing cycles of the at least one processor, process each page of the plurality of pages as the response to the single streaming request is received. In further examples, each page of the plurality of pages includes a sync token. In further examples, the sync token indicates a last metadata update that is processed as the response to the single streaming request is received. In further examples, the updated metadata includes metadata changes that occurred since a last request was sent to the application service for updated metadata of the dataset. In further examples, the updated metadata includes metadata changes that have not been processed by the client computing device. In further examples, the updated metadata includes metadata changes that occurred between a first time and a second time. In further examples, each page of the plurality of pages includes metadata changes that occurred in a time span within the first time and the second time. In further examples, the client computing device is a compute limited client computing device.

Further aspects disclosed herein provide an exemplary computer-implemented method for synchronizing a dataset in a client computing device, the method comprising: launching an application in a foreground of the client computing device; sending a single streaming request to an application service for updated metadata of the dataset while the application is running in the foreground; receiving a response to the single streaming request, the response including the updated metadata of the dataset, where the updated metadata is represented as a plurality of pages; and while the application is running in a background of the client computing device, processing each page of the plurality of pages as the response to the single streaming request is received. In further examples, the computer-implemented method further comprises upon a network error occurring while receiving the response to the first single streaming request, identifying a last processed page of the plurality of pages of updated metadata. In further examples, the computer-implemented method further comprises subsequent to the network error occurring, launching the application. In further examples, the computer-implemented method further comprises sending another single streaming request for the updated metadata of the dataset remaining after a last processed metadata update. In further examples, the updated metadata includes metadata changes that occurred since a last request was sent to the application service for updated metadata of the dataset. In further examples, the updated metadata includes metadata changes that have not been processed by the client computing device. In further examples, the client computing device is a compute limited client computing device.

Additional aspects disclosed herein provide an exemplary system comprising at least one processor; and memory encoding computer executable instructions that, when executed by the at least one processor, perform a method for resuming syncing of updated metadata of a dataset comprising: receiving a response to a first single streaming request issued by an application for the updated metadata of the dataset, where the updated metadata is represented as a plurality of pages; processing each page of the plurality of pages of updated metadata as the response to the first single streaming request is received; upon a network error occurring while receiving the response to the first single streaming request, identifying a last processed page of the plurality of pages of updated metadata; subsequent to the network error occurring, launching the application; and sending a second single streaming request for the updated metadata of the dataset represented by each page of the plurality of pages remaining after the last processed page of the plurality of pages of updated metadata. In further examples, the application is launched in a foreground of the client computing device. In further examples, the response to the first single streaming request is received while the application is not running. In further examples, the method further comprises receiving a response to the second single streaming request, the response including the updated metadata of the dataset represented by each page of the plurality of pages remaining after the last processed page of the plurality of pages of updated metadata. In further examples, the method further comprises processing each page of the plurality of pages as the response to the second single streaming request is received.

Techniques for syncing updated metadata using a chunked response are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of metadata syncing systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
   one or more computer readable storage media; and
   program instructions stored on the one or more computer readable storage media that, when executed by at least one processor, cause the at least one processor to at least:
   launch an application of a client computing device;
   send a single streaming request to an application service for updated metadata of a dataset;
   receive a response to the single streaming request, the response including the updated metadata of the dataset, where the updated metadata is represented as a plurality of pages;
   when the application has access to processing cycles of the at least one processor, process each page of the plurality of pages as the response to the single streaming request is received; and
   upon a network error occurring while receiving the response to the single streaming request, identifying a last processed page of the plurality of pages of updated metadata.

2. The system of claim 1, wherein each page of the plurality of pages includes a sync token.

3. The system of claim 2, wherein the sync token indicates a last metadata update that is processed as the response to the single streaming request is received.

4. The system of claim 1, wherein the updated metadata includes metadata changes that occurred since a last request was sent to the application service for updated metadata of the dataset.

5. The system of claim 1, wherein the updated metadata includes metadata changes that have not been processed by the client computing device.

6. The system of claim 1, wherein the updated metadata includes metadata changes that occurred between a first time and a second time.

7. The system of claim 6, wherein each page of the plurality of pages includes metadata changes that occurred in a time span within the first time and the second time.

8. The system of claim 1, wherein the client computing device is a compute limited client computing device.

9. A computer-implemented method for synchronizing a dataset in a client computing device, the method comprising:
   launching an application in a foreground of the client computing device;
   sending a single streaming request to an application service for updated metadata of the dataset while the application is running in the foreground;
   receiving a response to the single streaming request, the response including the updated metadata of the dataset, where the updated metadata is represented as a plurality of pages;
   while the application is running in a background of the client computing device, processing each page of the plurality of pages as the response to the single streaming request is received; and
   upon a network error occurring while receiving the response to the single streaming request, identifying a last processed page of the plurality of pages of updated metadata.

10. The computer-implemented method of claim 9, further comprising subsequent to the network error occurring, launching the application.

11. The computer-implemented method of claim 10, further comprising sending another single streaming request for the updated metadata of the dataset remaining after a last processed metadata update.

12. The computer-implemented method of claim 9, wherein the updated metadata includes metadata changes that occurred since a last request was sent to the application service for updated metadata of the dataset.

13. The computer-implemented method of claim 9, wherein the updated metadata includes metadata changes that have not been processed by the client computing device.

14. The computer-implemented method of claim 9, wherein the client computing device is a compute limited client computing device.

15. The computer-implemented method of claim 9, wherein the last processed page of the plurality of pages of updated metadata is identified using a sync token.

16. A system comprising:

at least one processor; and memory encoding computer executable instructions that, when executed by the at least one processor, perform a method for resuming syncing of updated metadata of a dataset comprising:

receiving a response to a first single streaming request issued by an application for the updated metadata of the dataset, where the updated metadata is represented as a plurality of pages;

processing each page of the plurality of pages of updated metadata as the response to the first single streaming request is received;

upon a network error occurring while receiving the response to the first single streaming request, identifying a last processed page of the plurality of pages of updated metadata;

subsequent to the network error occurring, launching the application; and sending a second single streaming request for the updated metadata of the dataset represented by each page of the plurality of pages remaining after the last processed page of the plurality of pages of updated metadata.

17. The system of claim 16, wherein the application is launched in a foreground of the client computing device.

18. The system of claim 16, wherein the response to the first single streaming request is received while the application is not running.

19. The system of claim 16, further comprising receiving a response to the second single streaming request, the response including the updated metadata of the dataset represented by each page of the plurality of pages remaining after the last processed page of the plurality of pages of updated metadata.

20. The system of claim 19, further comprising processing each page of the plurality of pages as the response to the second single streaming request is received.

* * * * *